US008961190B2

(12) United States Patent
Hart et al.

(10) Patent No.: US 8,961,190 B2
(45) Date of Patent: Feb. 24, 2015

(54) ADVANCED SURGICAL SIMULATION (71) Applicant: Applied Medical Resources Corporation, Rancho Santa Margarita, CA (US)

(72) Inventors: Charles C. Hart, Rancho Santa Margarita, CA (US); Tracy Breslin, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 57 days.

(21) Appl. No.: 13/722,675

(22) Filed: Dec. 20, 2012

(65) Prior Publication Data

US 2013/0157240 A1 Jun. 20, 2013

Related U.S. Application Data (60) Provisional application No. 61/578,080, filed on Dec. 20, 2011.

(51) Int. Cl.
*G09B 23/30* (2006.01)
*G09B 23/28* (2006.01)

(52) U.S. Cl.
CPC .............. *G09B 23/30* (2013.01); *G09B 23/285* (2013.01)
USPC .......................................................... 434/267

(58) Field of Classification Search
CPC ...................................................... G09B 23/30
USPC ...................... 606/27–52; 434/267
See application file for complete search history.

(56) References Cited

U.S. PATENT DOCUMENTS

| 3,991,490 A | 11/1976 | Markman |
| 4,001,951 A | 1/1977 | Fasse |
| 4,332,569 A | 6/1982 | Burbank |

(Continued)

FOREIGN PATENT DOCUMENTS

| DE | 41 05 892 | 8/1992 |
| DE | 44 14 832 | 11/1995 |

(Continued)

OTHER PUBLICATIONS

European Patent Office, The International Search Report and Written Opinion for International Application No. PCT/US2012/070971, mailed Jul. 4, 2014, entitled "Advanced Surgical Simulation Constructions and Methods".

(Continued)

*Primary Examiner* — Sam Yao
*Assistant Examiner* — Jennifer L Fassett
(74) *Attorney, Agent, or Firm* — Rimas T. Lukas (57) ABSTRACT

A system for training a clinician in energy-based surgical techniques that advantageously does not require the simulated tissue to be electrically conductive is provided. The simulated tissue comprises one or more materials. A heat generator is configured in the shape of a medical instrument typically encountered in energy-based surgical procedures such as electrosurgery or electrocautery. The instrument delivers sufficient heat to melt at least one of the materials in order to simulate energy-based surgical techniques such as excising target material. The one or more materials are configured in the simulated tissue such that their relative thermoplasticity defines a predetermined surgical pathway of a desired clinical outcome.

9 Claims, 8 Drawing Sheets

(56) References Cited

U.S. PATENT DOCUMENTS

| | | | |
|---|---|---|---|
| 4,459,113 A | 7/1984 | Boscaro Gatti et al. | |
| 4,596,528 A * | 6/1986 | Lewis et al. | 434/270 |
| 4,726,772 A | 2/1988 | Amplatz | |
| 4,789,340 A | 12/1988 | Zikria | |
| 4,907,973 A | 3/1990 | Hon | |
| 5,104,328 A | 4/1992 | Lounsbury | |
| 5,149,270 A | 9/1992 | McKeown | |
| 5,180,308 A | 1/1993 | Garito et al. | |
| 5,230,630 A | 7/1993 | Burgett | |
| 5,295,694 A | 3/1994 | Levin | |
| 5,320,537 A | 6/1994 | Watson | |
| 5,368,487 A | 11/1994 | Medina | |
| 5,403,191 A | 4/1995 | Tuason | |
| 5,425,731 A | 6/1995 | Daniel et al. | |
| 5,518,406 A | 5/1996 | Waters | |
| 5,620,326 A | 4/1997 | Younker | |
| 5,722,836 A | 3/1998 | Younker | |
| 5,769,640 A | 6/1998 | Jacobus et al. | |
| 5,775,916 A | 7/1998 | Cooper et al. | |
| 5,785,531 A * | 7/1998 | Leung | 434/262 |
| 5,800,178 A | 9/1998 | Gillio | |
| 5,873,732 A | 2/1999 | Hasson | |
| 5,873,863 A | 2/1999 | Komlosi | |
| 5,947,743 A | 9/1999 | Hasson | |
| 5,951,301 A | 9/1999 | Younker | |
| 6,234,804 B1 | 5/2001 | Yong | |
| 6,336,812 B1 | 1/2002 | Cooper et al. | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,511,325 B1 | 1/2003 | Lalka et al. | |
| 6,517,354 B1 | 2/2003 | Levy | |
| 6,568,941 B1 | 5/2003 | Goldstein | |
| 6,659,776 B1 | 12/2003 | Aumann et al. | |
| 6,773,263 B2 | 8/2004 | Nicholls et al. | |
| 6,780,016 B1 | 8/2004 | Toly | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,997,719 B2 | 2/2006 | Wellman et al. | |
| 7,008,232 B2 | 3/2006 | Brassel | |
| 7,255,565 B2 | 8/2007 | Keegan | |
| 7,272,766 B2 | 9/2007 | Sakezles | |
| 7,419,376 B2 | 9/2008 | Sarvazyan et al. | |
| 7,427,199 B2 | 9/2008 | Sakezles | |
| 7,467,075 B2 | 12/2008 | Humphries et al. | |
| 7,594,815 B2 | 9/2009 | Toly | |
| 7,677,897 B2 | 3/2010 | Sakezles | |
| 7,780,451 B2 | 8/2010 | Willobee et al. | |
| 7,802,990 B2 | 9/2010 | Korndorffer et al. | |
| 7,806,696 B2 | 10/2010 | Alexander et al. | |
| 7,833,018 B2 | 11/2010 | Alexander et al. | |
| 7,837,473 B2 | 11/2010 | Koh | |
| 7,850,454 B2 | 12/2010 | Toly | |
| 7,857,626 B2 | 12/2010 | Toly | |
| 7,931,470 B2 | 4/2011 | Alexander et al. | |
| 7,993,140 B2 | 8/2011 | Sakezles | |
| 2001/0019818 A1 | 9/2001 | Yong | |
| 2004/0248072 A1 | 12/2004 | Gray et al. | |
| 2005/0008997 A1 | 1/2005 | Herman | |
| 2005/0026125 A1 | 2/2005 | Toly | |
| 2005/0084833 A1 | 4/2005 | Lacey et al. | |
| 2005/0142525 A1 | 6/2005 | Cotin et al. | |
| 2005/0196739 A1 | 9/2005 | Moriyama | |
| 2005/0196740 A1 | 9/2005 | Moriyama | |
| 2005/0214727 A1 | 9/2005 | Stoianovici et al. | |
| 2006/0046235 A1 | 3/2006 | Alexander et al. | |
| 2006/0275741 A1 | 12/2006 | Chewning et al. | |
| 2007/0166682 A1 | 7/2007 | Yarin et al. | |
| 2008/0032273 A1 | 2/2008 | Macnamara et al. | |
| 2008/0064017 A1 | 3/2008 | Grundmeyer, III | |
| 2008/0187895 A1 | 8/2008 | Sakezles | |
| 2008/0299529 A1 | 12/2008 | Schaller | |
| 2009/0068627 A1 | 3/2009 | Toly | |
| 2009/0142739 A1 | 6/2009 | Wang et al. | |
| 2009/0142741 A1 | 6/2009 | Ault et al. | |
| 2009/0176196 A1 | 7/2009 | Niblock et al. | |
| 2009/0187079 A1 | 7/2009 | Albrecht et al. | |
| 2009/0246747 A1 | 10/2009 | Buckman, Jr. | |
| 2010/0099067 A1 | 4/2010 | Agro | |
| 2010/0167250 A1 | 7/2010 | Ryan et al. | |
| 2010/0167253 A1 | 7/2010 | Ryan et al. | |
| 2010/0209899 A1 | 8/2010 | Park | |
| 2010/0279263 A1 | 11/2010 | Duryea | |
| 2011/0207104 A1 | 8/2011 | Trotta | |
| 2011/0281251 A1 | 11/2011 | Mousques | |
| 2012/0028231 A1 | 2/2012 | Misawa et al. | |
| 2012/0045743 A1 | 2/2012 | Okano et al. | |
| 2012/0082970 A1 | 4/2012 | Pravong et al. | |
| 2012/0202180 A1 | 8/2012 | Stock et al. | |

FOREIGN PATENT DOCUMENTS

| | | |
|---|---|---|
| DE | 19716341 C2 | 9/2000 |
| FR | 2 691 826 | 12/1993 |
| JP | 10 211160 | 8/1998 |
| WO | WO 99/1074 A1 | 1/1999 |
| WO | WO 00/36577 | 6/2000 |
| WO | WO 02/38039 A2 | 5/2002 |
| WO | WO 02/38039 A3 | 5/2002 |
| WO | WO 2007/068360 | 6/2007 |
| WO | WO 2009/000939 | 12/2008 |

OTHER PUBLICATIONS

International Bureau of WIPO, International Preliminary Report on Patentability for International Application No. PCT/US2012/070971, titled "Advanced Surgical Simulation" dated Jun. 24, 2014.

International Bureau of WIPO, International Preliminary Report on Patentability for International Application No. PCT/US2012/060997, titled "Simulated Tissue Structure for Surgical Training" dated Apr. 22, 2014.

European Patent Office, International Search Report for International Application No. PCT/US2011/053859 A3, mailed on Apr. 5, 2012, entitled "Portable Laparoscopic Trainer".

European Patent Office, The International Search Report and Written Opinion for International Application No. PCT/US2012/60997, mailed Mar. 7, 2013, entitled "Simulated Tissue Structure for Surgical Training".

European Patent Office, The International Search Report and Written Opinion for International Application No. PCT/US2012/070971, mailed Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability with Written Opinion for International Application No. PCT/US2011/053859, titled "Portable Laparoscopic Trainer" dated Apr. 2, 2013.

* cited by examiner

ADVANCED SURGICAL SIMULATION

CROSS-REFERENCE TO RELATED APPLICATION

This application claims priority to and benefit of U.S. Provisional Patent Application Ser. No. 61/578,080 entitled "Advanced surgical simulation" filed on Dec. 20, 2011 which is incorporated herein by reference in its entirety.

FIELD OF THE INVENTION

The present invention is directed to medical training and simulation systems and devices that provide a user with visual, tactile and technical properties that emulate the situations extant in live surgical procedures.

BACKGROUND

Many surgical procedures involve the use of energy-based surgical instruments such as electrosurgical blades, probes, scissors, graspers, dissectors, electrocautery instruments and the like. Generally, electrosurgery is performed using an electrosurgical generator connected to an alternating current power supply and an instrument including one or more electrodes. Voltage is provided by the generator and high-frequency electric current typically in the range of 200 kHz to 3.3 MHz is delivered to biological tissue through the electrode tip of the instrument or handpiece as a means to cut, coagulate, desiccate or fulgurate tissue. As the current is delivered, it passes through and heats the tissues to create the desired clinical effect. Alternatively, the electrical current is used to heat an instrument and a clinical effect is realized when the heated instrument is applied to tissue as in electrocautery. Additionally, many procedures make use of energy devices based on high frequency sound also known as ultrasound devices. These and other energy-based instruments advantageously provide a surgeon with the ability to make precise and nearly effortless cuts, dissect tissue and nearly instant thermal hemostasis limiting blood loss. Such instruments have become a standard within the surgical community and are used regularly in a variety of procedures.

Because of the effectiveness of electrosurgical and other energy-based instruments and procedures, it is important to train the clinician in the use of energy-based surgical instruments and procedures. Many of the existing training or simulating modules use live tissue from animals or cadavers. Real live tissue may be expensive and difficult to obtain, requires preservation using refrigeration and generates a smoke plume and odor when cauterized. With real tissue, a grounding plate is attached to an electrosurgical generator and the grounding plate is placed underneath the patient so that the current penetrates deeper into the tissues. In general, the practice of electrosurgical techniques using real tissue requires additional safety considerations. Alternatively, in some simulation modules, synthetic materials that mimic the characteristics of living tissue are also employed in place of real tissue. Some of these synthetic materials that mimic the look and feel of real tissue include silicone elastomers, natural latex, polyurethane elastomers and styrenic-block copolymers. In order to serve as simulated tissue for practicing the use of energy-based surgical instruments, synthetic organ models must be wetted or infused with saline solution or embedded with materials such as metallic particles so that they are electrically conductive. Generally, the elastomeric materials are dielectric unless specially treated to conduct electric current. However, the most preferred synthetic materials such as silicone rubber, latex, vinyl, polyester, polyurethane and the like do not respond to energy-based surgical devices in a way that satisfies the need to train users to use the devices in an actual surgical procedure. Hence, there is a need to provide a system and method for simulating energy-based instruments that employs non-living, non-electrically conductive simulation tissue, yet simulates electrically conductive, living tissue for the practice of techniques used in electrosurgery, electrocautery and other energy-based systems. In order to simplify training and minimize the use of cadavers in surgical training, the present invention uses synthetic, materials that are compounded, configured and combined to emulate the properties, responses and characteristics of human or animal tissue under surgical conditions and in response to the activities of energy-based instruments. Such conditions and activities may include incision, penetration, dissection, occlusion, anastamosis, approximation, ablation, and the like.

SUMMARY

According to one aspect of the invention, a device for simulating energy-base surgical techniques is provided. The device includes a synthetic anatomical tissue structure comprising a base material having a first melting temperature forming a base layer, a subject material having a second melting temperature forming a subject layer connected to the base layer, and a target material having a third melting temperature forming a target layer connected to the subject layer. The system further includes a heat-generating instrument configured to deliver heat to melt the subject material.

According to another aspect of the invention, a device for training energy-based surgical techniques that does not require simulated tissue to conduct electricity is provided. The device comprises simulated tissue comprising two materials having different melting temperatures and a heat generator in the shape of a medical device. The heat generator is configured to deliver sufficient heat to melt the material with the lower melting temperature but not high enough to melt the material having the higher melting temperature in order to simulate energy-based surgical techniques such as electrocautery or electrosurgery.

According to another aspect of the invention, a method for simulating energy-based surgical techniques in a training environment is provided. The method includes the step of using a simulated tissue structure comprising a first material having a first melting temperature and a second material having a second melting temperature wherein the second melting temperature is higher than the first melting temperature and wherein the first and second materials are configured such that the second material is excisable from the first by melting the at least a portion of the first material. The method further includes the step of using a simulated energy-based surgical instrument configured to deliver heat at its distal end sufficient to melt the first material but not sufficient to melt the second material. The method further includes the step of melting the first material with the simulated energy-based surgical instrument. The method further includes the step of removing the second material with respect to the first material.

According to another aspect of the invention a device for training energy-based surgical techniques is provided. The device includes a synthetic anatomical structure comprising a first material having a first melting temperature and a second material connected to the first material. The first material and the second material are configured such that the second material is removable from the first material upon melting at least a portion of the first material. The device further includes a heat-generating instrument configured to deliver heat to melt the first material.

According to another aspect of the invention, a method for simulating energy-based surgical techniques is provided. The method includes the step of providing a simulated tissue structure comprising a first thermoplastic material having a first melting temperature. The method further includes the step of providing a simulated surgical instrument configured to generate heat to thermoplastically deform the first material. At least a portion of the first material is heated with the heat generator and thermoplastically deformed with the heat generator.

According to another aspect of the invention, a system for simulating energy-based surgical techniques is provided. The system includes a simulated tissue structure comprising a first material having a first melting temperature and a second material connected to the first material. The first material and the second material are configured such that the second material is removable from the first material upon melting at least a portion of the first material. The system includes a heat-generating instrument in the shape of a medical device encountered in energy-based surgical procedures and configured to deliver heat to melt the first material.

According to another aspect of the invention, the present invention provides an energy-based device that is configured to cooperate with certain preferred synthetic tissue materials to provide an emulation of energy based surgical activity at a greatly reduced cost and complexity as compared with the use of harvested, preserved tissue or infused synthetic materials.

According to another aspect of the invention, a non-living, non-electrically conductive simulated tissue structure is provided that simulates electrically conductive, living tissue for the practice of techniques used in electrosurgery, electrocautery and other energy-based systems. A heat generating device that mimics a medical device encountered in actual energy-based systems is configured to generate heat sufficient to thermoplastically deform at least one thermoplastically deformable material comprising the simulated tissue structure. The at least one thermoplastically deformable material is arranged relative to at least one second material so as to define at least one predetermined pathway to be following with the heat generating device in the practice of energy-based surgical methods and procedures. At least one of the predetermined pathways defines a successful clinical outcome and the at least one second material has a melting or softening temperature that is substantially unaffected by the heat generated by the heat generating device or otherwise does not have a melting temperature or is not thermoplastically deformable.

DETAILED DESCRIPTION OF THE PREFERRED EMBODIMENTS

Figure 1:
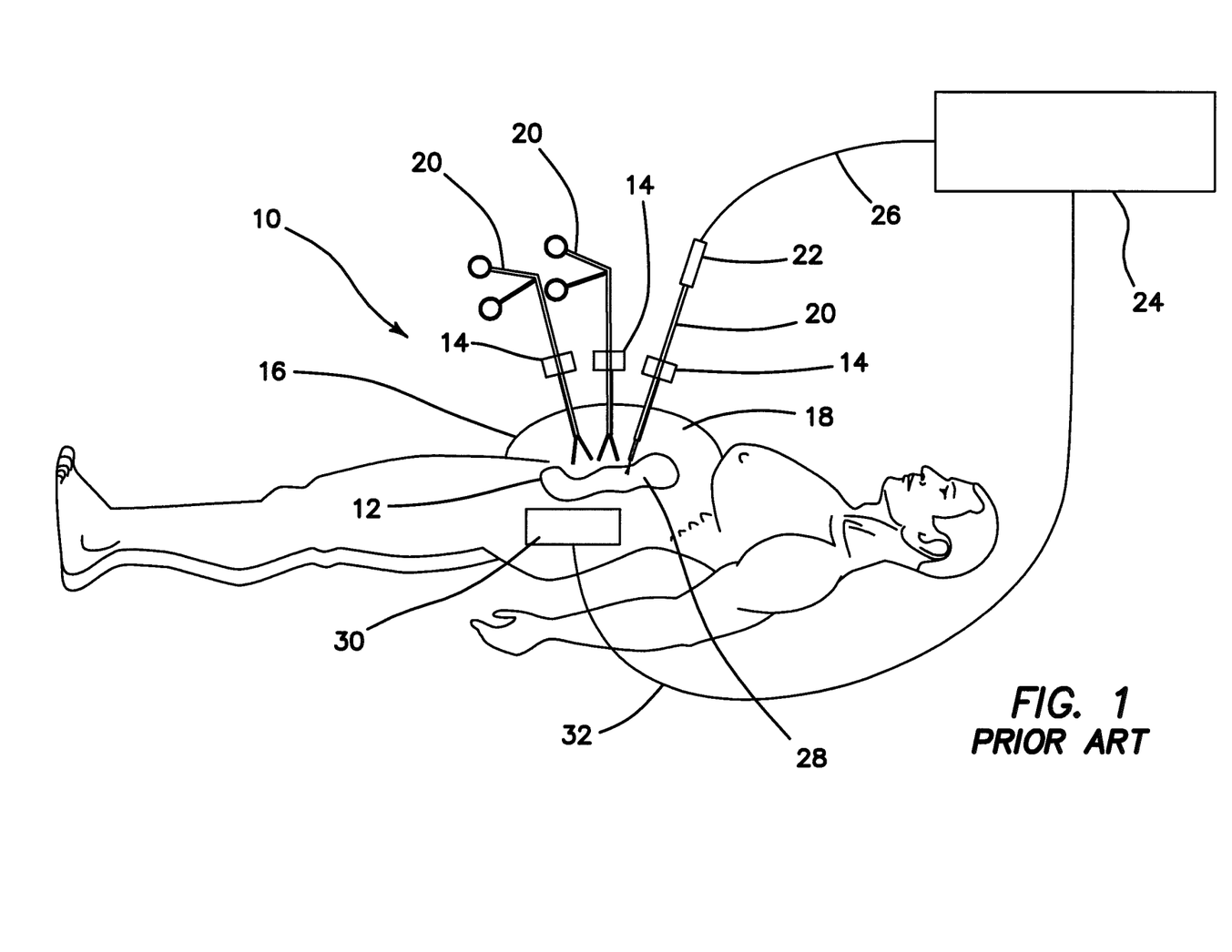
FIG. 1 is an illustration of a typical laparoscopic surgical procedure with electrosurgery.

With reference to the drawings, FIG. 1 illustrates a typical laparoscopic setup 10 where access to internal body organs 12 is provided by one or more access port 14 placed through a body wall 16 and into a body cavity 18. Various elongate surgical instruments 20 are placed through the one or more access port 14 and into the body cavity 18 to manipulate internal organs or structures 12. Special attention is directed to a variety of surgical instruments 20, in particular, energy-based instruments 22 such as but not limited to electrosurgical instruments 22 or electrocautery instruments that are connected to an energy source 24 for use in surgery. In particular, electrosurgery involves the application of high voltage, high frequency electrical energy to tissue for the purpose of cutting, destroying, coagulating, desiccating, or fulgurating tissue. Its benefits include the ability to make precise cuts with limited blood loss. In living tissue, an electrosurgical instrument 22 may be connected so that energy is directed through tissue to heat tissue via the electric current and create a "cutting" event at the location where the instrument 22 contacts the tissue. For example, an electrosurgical instrument 22 such as scissors, a grasper or knife may be employed to cut, divide or cauterize living tissue via the delivery of energy through the instrument 22. The electrosurgical instrument 22 is connected to an energy source 24. The energy source 24 generally comprises an electrosurgical generator that provides a very high voltage and high frequency current. The electrosurgical generator is typically connected to an alternating current source (not shown). A wire 26 connects the electrosurgical generator to the electrosurgical instrument 22 and is configured for delivering the appropriate current to the electrosurgical instrument 22. The electrosurgical arrangement 10 depends on the tissue 12 being electrically conductive as is the case with living tissue. The current is directed to a target location 28 where the electrosurgical "cutting" event occurs. The electrical discharge is then dissipated through the adjacent tissue and is returned to the generator through a grounding electrode or patch 30 that is secured to the underside of the tissue with a conductive adhesive. The electrode patch 30 serves as the return anode that would typically be placed underneath the patient's back during surgery. The circuit is completed with a wire connection 32 to the grounding portion of the electrosurgical generator 24.

Figure 2:
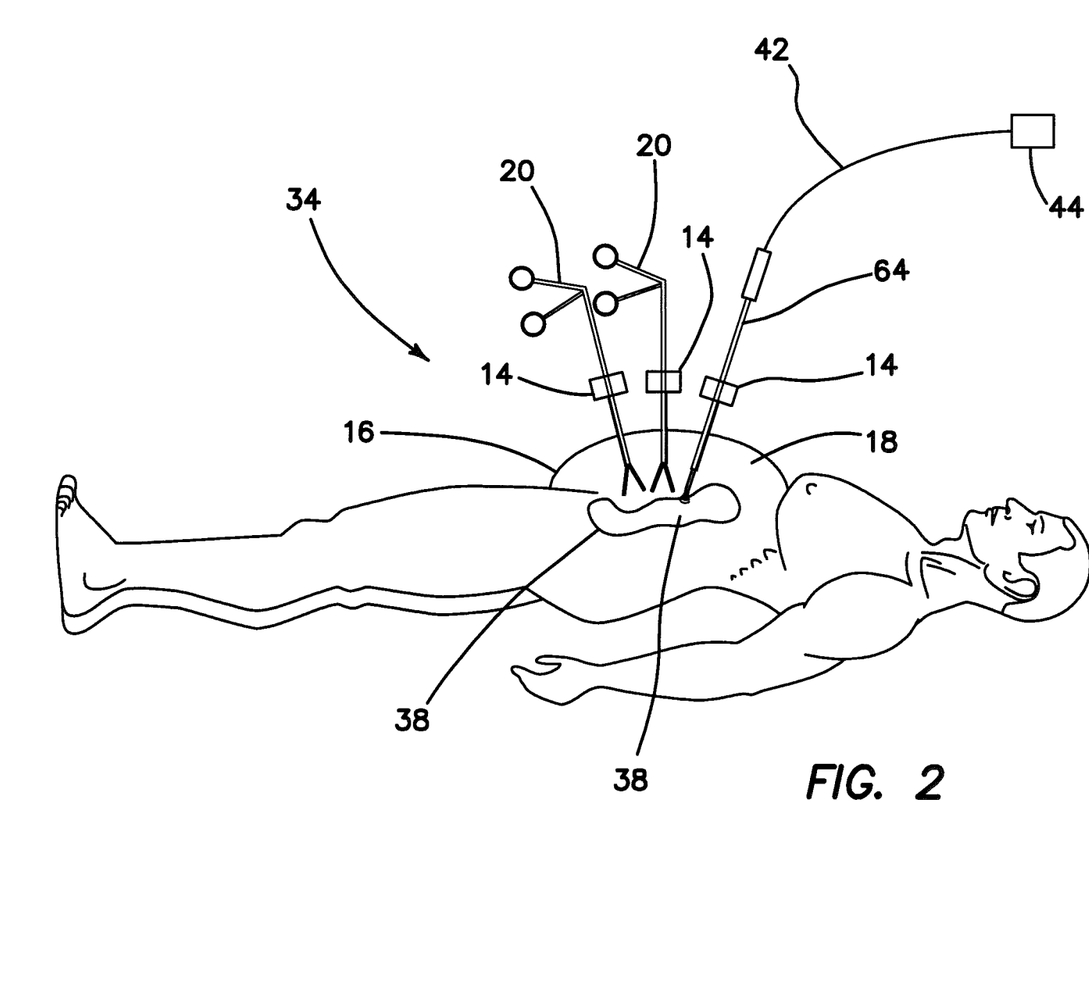
FIG. 2 is an illustration of a laparoscopic mannequin with simulated energy-based surgery according to the present invention.

Turning now to FIG. 2 a synthetic laparoscopic mannequin 34 is shown where a body form is constructed from synthetic, non-electrically conductive, materials such as plastic, rubber, wood, cloth or the like. Materials may be selected and combined to simulate a living body and living internal organs. It becomes apparent that a synthetic laparoscopic surgical mannequin 34 made of non-electrically conductive materials prevents the use of an actual electrosurgical arrangement that requires the target simulated tissue to be conductive. A simulated electrosurgical arrangement of the present invention includes a heat-generating instrument 64 that is configured to act upon simulated tissue 38 that comprises at least a portion of meltable synthetic simulated tissue 38 that is combinable with non-meltable synthetic tissue. Simulated tissue may include, skin, fascia, muscle, fat, connective, organ bed, organs, tumors, bone, veins, arteries and any other representation of human or non-human tissue with at least part of the simulated tissue comprising a meltable material. In one variation, all of the aforementioned tissues or organs are constructed of a combination of meltable and non-meltable synthetic materials. In another variation, the simulated tissue is all constructed of meltable synthetic materials. In yet another variation, the simulated tissue is constructed of two or more synthetic materials having different melting temperatures. The heated laparoscopic simulated electrosurgical heat-generating instrument 64 is configured to resemble an elongate probe, scissor, knife, grasper, dissector or may take the form of any other real medical device. The simulation heat-generating instrument 64 is electrically connected via a wire 42 to an electric power source 44. A grounding circuit including a grounding electrode or patch 30 is not required because the simulated tissue 38 is advantageously not constructed of electrically conductive material. Furthermore, the power source 44 can be an alternating current source or advantageously a direct current source that permits the training construct to be easily portable for demonstration or practice with a battery residing in the handle of the heat-generating instrument 64 avoiding the interference from the wire 42. A battery may also reside external to the heat-generating instrument 64. Other surgical instruments 20 including the simulation heat-generating instrument 64 are shown inserted into the one or more access port 14 to perform surgical procedures laparoscopically with live images captured via a laparoscope also inserted through an access port 14 and displayed on a video monitor for the surgeon to observe. The one or more access port 14 is placed through a body wall 16 and into a body cavity 18 distended with insufflation gas to create an operative space accessible via the minimally invasive access devices 14.

Figure 3:
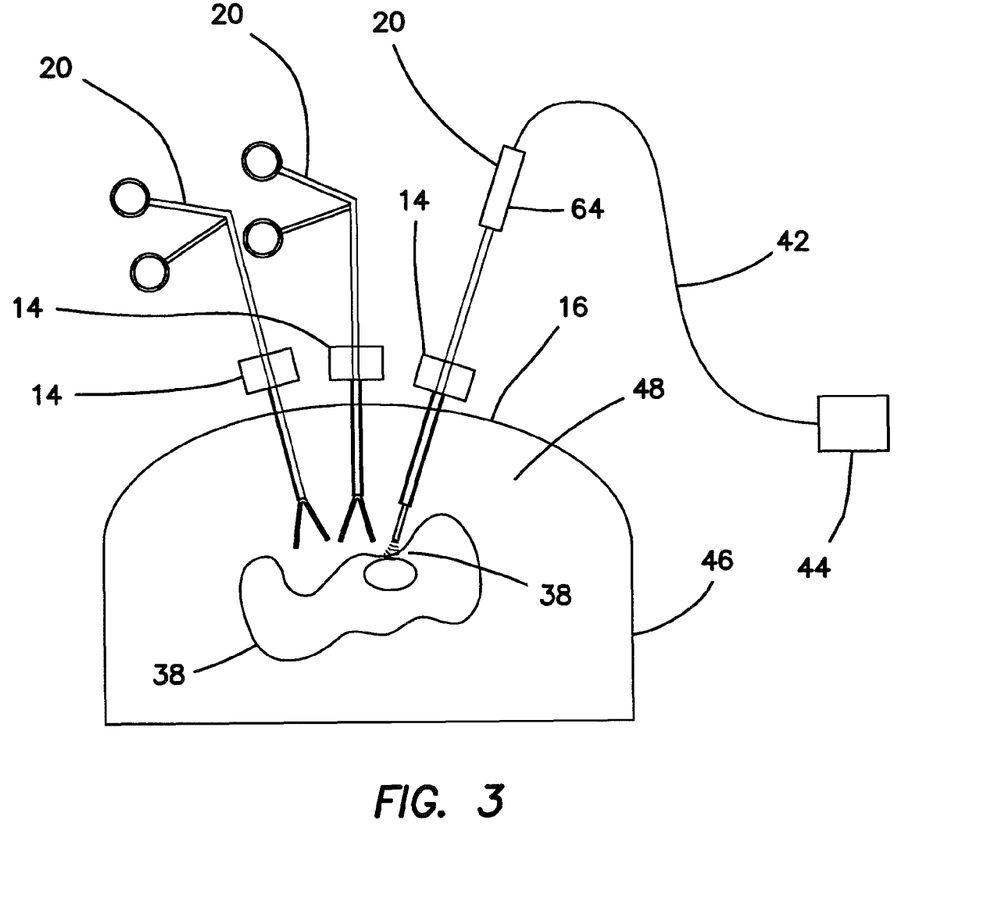
FIG. 3 is an illustration of a laparoscopic training module with simulated energy-based surgery according to the present invention.

FIG. 3 illustrates synthetic simulated tissue 38 organ components arranged within a simulated training module or laparoscopic trainer 46 instead of a large mannequin shown in FIG. 2. A laparoscopic trainer 46 may comprise a structure that simulates a specific portion of a physical anatomy. For example, FIG. 3 illustrates a human abdominal section or body cavity 48 where a simulated tissue 38 internal organ is placed or suspended within a hollow structure and at least a portion of the simulated tissue 38 internal organ is obscured from direct visualization by the clinician so that laparoscopic techniques can be practiced. An exemplary laparoscopic trainer 46 is described in co-pending U.S. patent application Ser. No. 13/248,449 entitled "Portable laparoscopic trainer" filed on Sep. 29, 2011 and incorporated herein by reference in its entirety as if fully set forth herein. The structure may be rigid or flexible and may be inflated or constructed to simulate an inflated body cavity 48. The laparoscopic trainer 46 includes one or more access port 14 inserted across a body wall 16 for accessing the body cavity 48 with various surgical instruments 20 and an energy-based simulation heat-generating instrument 64 shown connected to a power source 44 via wire 42 and directed towards target meltable synthetic simulated tissue 38. The access port 14 provide a minimally invasive means to access the target surgical site within the patient while maintaining pneumoperitoneum deliberately created in real laparoscopic surgery or simulated by the body wall 16 of the laparoscopic trainer 46.

Figure 4:
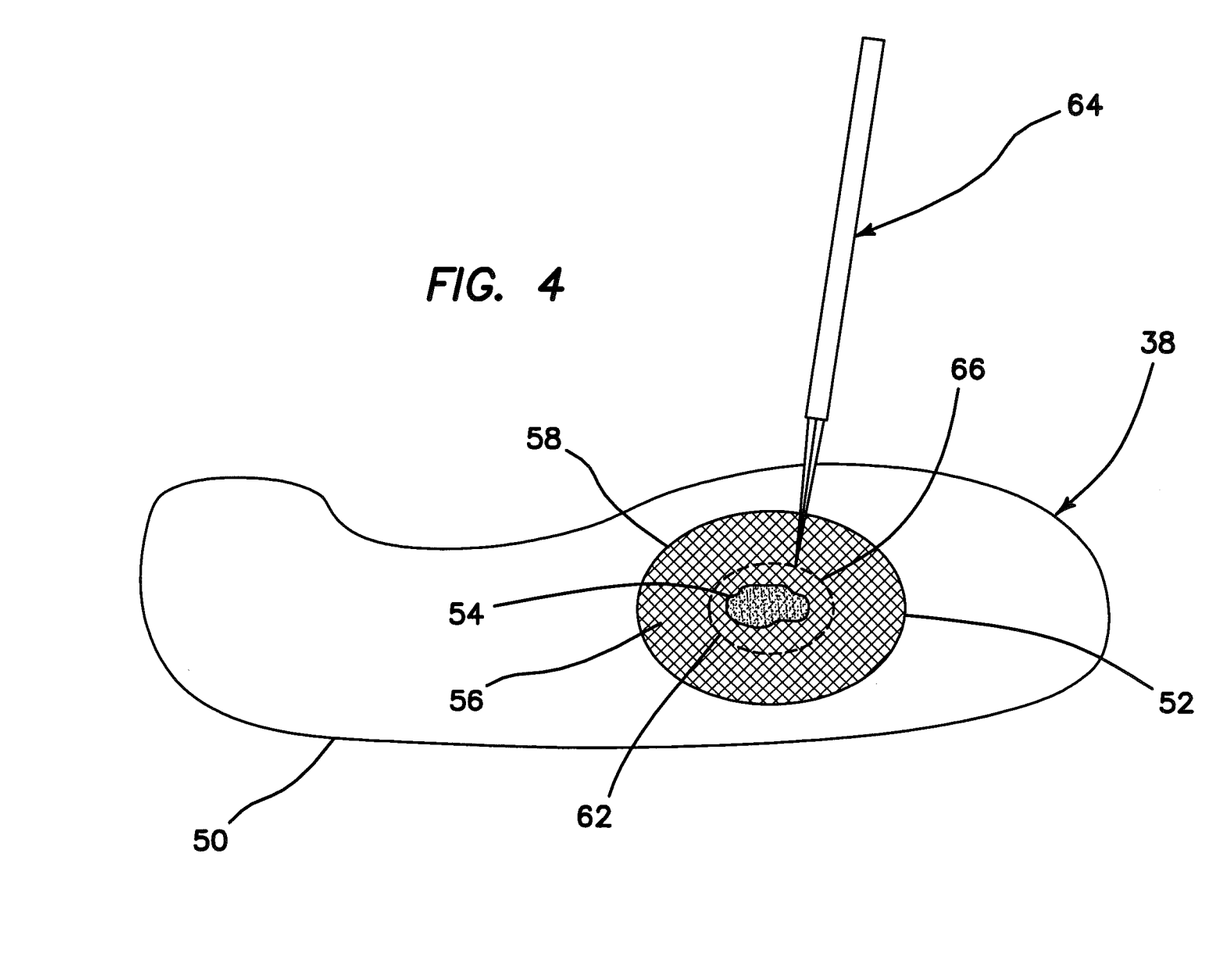
FIG. 4 is a perspective view of a synthetic organ combination and energy-based surgical unit for use with simulated energy-based surgery according to the present invention.
Figure 5:
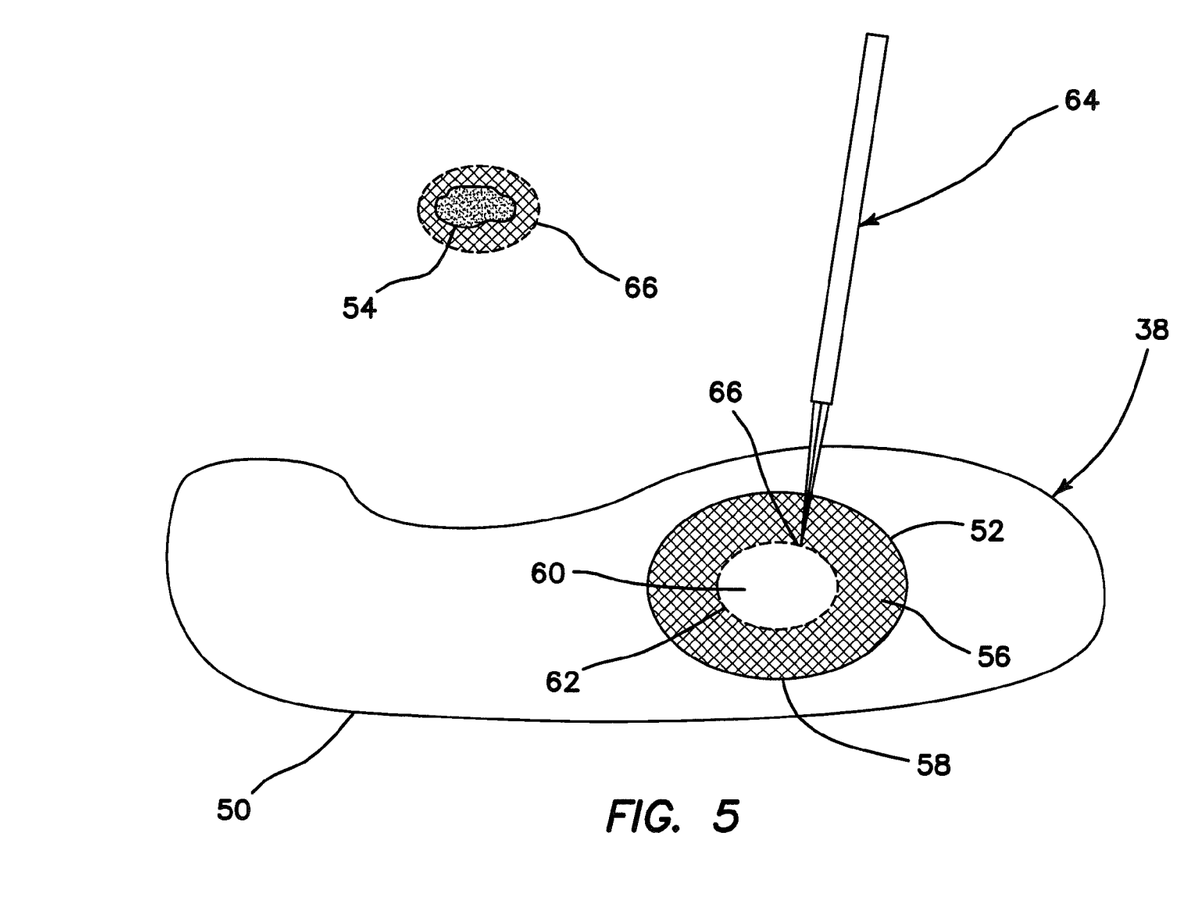
FIG. 5 is a perspective view of a synthetic organ combination with a portion of synthetic tissue removed and an energy-based surgical unit according to the present invention.
Figure 6:
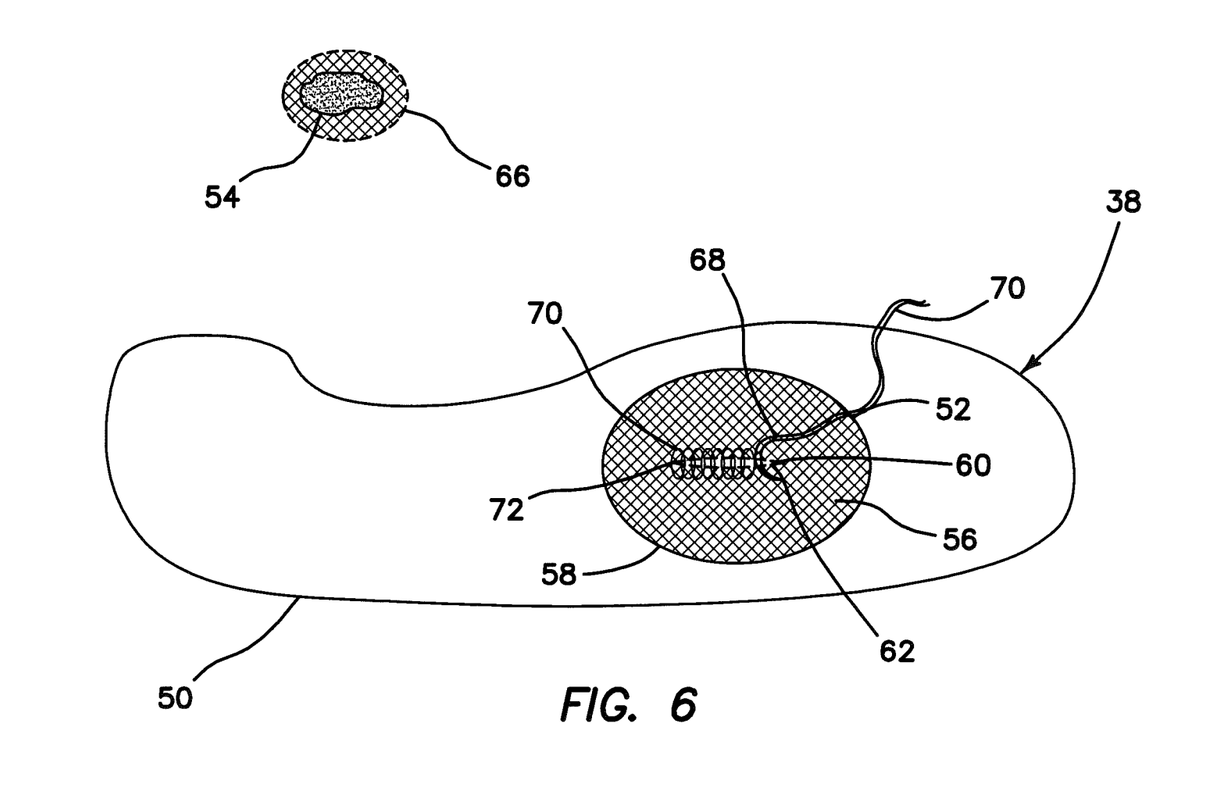
FIG. 6 is a perspective view of a synthetic organ combination with a portion of synthetic tissue removed and a suture closing the excised area of synthetic tissue according to the present invention.

With reference to FIGS. 4-6, a combination of synthetic tissue components comprises a base material 50 connected to a subject material 52 connected to a target material 54. A preferred base material 50 may include a non-meltable elastomeric such as silicone rubber, natural rubber, polyisoprene, any of a variety of polymers with elastic properties or the like or otherwise having a relatively high melting temperature compared to the subject material 52. Generally, the non-meltable polymer materials are referred to as thermosets or materials that permanently harden or solidify upon being heated or cured. The subject material 52 comprises a meltable material such as vinyl, polyester, nylon, spandex blend, LYCRA® brand synthetic elastic fiber or the like having a melting temperature relatively lower than the base material 50. The subject material 52 is selected according to the desired characteristics such as melt-temperature, flexibility and adhesion properties. The target material 54 is either meltable or non-meltable and is configured to be solid or hollow and may be filled with fluid or additional material. As an example, a base material 50 is shaped to represent an internal organ made of silicone rubber. This base material has a very good tolerance to high temperature and has a melting temperature higher relative to the subject material 52. A subject area 56 comprises subject material 52. In one variation, the subject area 56 comprises a section of meltable, thermoplastic material that melts at a specific temperature and may include a mesh or fabric material molded or embedded in the plastic. Thermoplastic materials may be repeatedly made soft and hard by heating and cooling. The subject material 52 is attached to the base material 50 and is colored to match or contrast with the base material 50. One variation of subject material 52 comprises a performance material or mesh woven to be stretchable in at least two directions and having an interlocking weave that prevents unraveling when the subject material 52 is cut or melted. The performance material or mesh fabric subject material 52 is attached to the polymer base material 50 along the circumference or perimeter 58 of subject material 52 so that when the subject material 52 is cut or melted, a pocket region or gap 60, shown in FIGS. 5 and 6, is created between the subject material 52 and the base material 50 or all the way through one or more of the subject material 52 and base material 50. In one variation, the target material 54 comprises a form or structure that resembles a lesion, tumor or other target structure that is to be excised from the subject material 52. For the purposes of training surgical candidates in specific procedures, the target material 54 may comprise a structure or form made of non-meltable, thermoset material such as silicone rubber or otherwise having a melting temperature relatively higher than the subject material 52. The structure or form of the target material 54 is solid or hollow and may be filled with fluid or other material. In an alternative variation, the target material 54 is made of a thermoplastic having the same or higher melting temperature relative to the subject material 52. The target material 54 is attached to the subject material 52 so that the target material 54 may be excised by melting the surrounding or encompassing subject material 52 making the target material 54 capable of being removed relative to the subject material 52. The simulated tissue is configured such that the subject material 52 is sufficiently large and encompassing so as to leave a margin 62 of subject material 52 attached to the base material 50 that may be subsequently resolved by suturing or stapling. In one variation, the subject material 52 includes a thermoplastic material molded over a woven, fabric, or mesh material such as nylon or cheesecloth so that the integrated mesh provides structural support or reinforcement especially useful when suturing or resolving a gap created by the excision. Any one or more of the base material 50, subject material 52 and target material 54 can include a fabric or mesh reinforcement combined with a polymer. The mesh support aids in preventing the suture, staple, or suture needle from tearing through at least one of layers when the suture is pulled to close the remnant gap after at least a portion of target material 54 is excised. The subject material 52 may additionally comprise a thermoplastic material formed or woven in such away that it emulates living tissue. Living tissue stretches in all lateral directions so that when cut or incised, it may be approximated by means of suture or staple. The preferred woven construction of the subject material 52 allows a user to suture or staple a defect as shown in FIG. 6 following excision of the target material 54 as would be the case in living tissue. In one embodiment, the subject material 52 is melted with a heat-generating instrument 64 or handpiece that is configured in the form of any real electrosurgical medical device that delivers heat sufficient to melt the non-conductive subject material 52 instead of a real electrosurgical charge to conductive tissue structure, said heat delivered by the heat-generating instrument 64 being sufficient to melt the thermoplastic or other polymer having a lower relative melting temperature to simulate an energy-based cutting technique. The subject material 52 is melted along a path line 66, for example, that circumscribes the target material 54 that is shaped as a tumor or defect to be excised. The melted circumscribed path line 66 advantageously prevents woven material from unraveling after being divided. The subject material 52 is configured around the foreseen target material 54 or otherwise along a predetermined or preselected pathway that is surgically significant for training purposes. The thusly created gap 60 as a result of the melting away of subject material 52 is seen in FIG. 5 and this gap 60 or defect may be closed, stapled or sutured. FIG. 6 illustrates a standard suture needle 68 and suture 70 forming a row of sutures 72 closing the gap 60. The simulation device not only allows the user to practice energy-based surgical techniques but also advantageously allows for the additional practice of suturing and stapling techniques as would be the case in a real non-simulated living tissue surgery.

Figure 7:
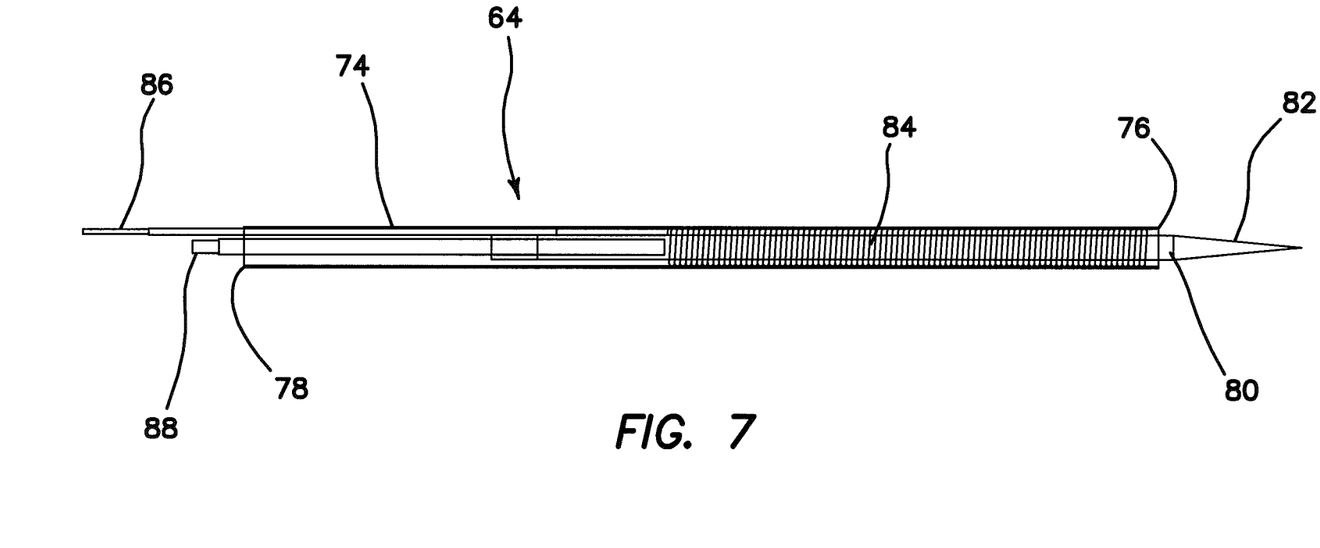
FIG. 7 is a semi-transparent side view of a simulated energy-based surgical unit according to the present invention.

With reference now to FIG. 7, a heat-generating instrument 64 is illustrated that is sized and configured to simulate an energy-based surgical instrument in a training environment. The heat-generating instrument 64 comprises an elongate tubular body 74 having a distal end 76 and a proximal end 78, and a cylindrical wall defining a lumen. The heat-generating instrument 64 comprises an electrically conductive and elongate heat-conductive probe member 80 disposed inside the lumen and having an exposed probe tip 82 sized and configured to simulate an energy-based surgical instrument. The heat-conductive probe member 80 is surrounded by an electrical heating coil 84 that is electrically insulated from the heat-conductive probe member 80. The distal end of the heating coil 84 is connected to the heat-conductive probe member 80 at one point. The proximal end of the heating coil 84 may be connected to a first electrical pole at a power source 44 seen in FIG. 2. The proximal end of the elongate heat-conductive probe member 80 is connected to a second electrical pole of a power source 44. In the circuit, current from a first electrical pole of a power source 44 is conducted through a wire 86 within the lumen of elongate tubular body 74 to the proximal end of the heating coil 84, returning through the heat-conductive probe member 80 to a wire 88 connected to a second electrical pole of a power source 44. In one embodiment, the heating coil 84 is constructed of high resistance, electrically-conductive element or wire made of nickel-chromium, for example, that is wound around the elongate heat-conductive probe member 80 to form a heating coil 84. The number of windings forming the heating coil 84 may be adjusted by a formula that yields a preferred temperature supplied by a preferred voltage according to the resistance (in Ohms) of the wire used to construct the heating coil 84. A preferred power source 44 may, for example, comprise 3 volt direct current supplied by a battery or power transformer. The heating element or heating coil 84 may comprise, for example, a coil having a resistance of 260 Ohms resulting in an active exposed probe tip 82 temperature of approximately 500 degrees Fahrenheit. An alternate construction of the heating coil 84 comprises a length of tungsten or other high resistance material connected to the opposite terminals of a power source 44 where a portion of the material extends beyond the connected portion to form a heated active tip. Although the heat-generating instrument 64 is shown to have a pencil shape, the invention is not so limited and the heat-generating instrument 64 can have the form of any energy-based medical device.

In another variation, the synthetic tumor bed subject material 52 is configured such that it may be cut with a sharp knife or scissor. The simulation in this embodiment allows the user to cut or excise the target material 54 from the same viewpoint or perspective as an electrosurgical arrangement. In addition, this alternate embodiment generates the same visual and tactile feedback as an electrosurgical arrangement. In addition, the tumor-base material 52 is woven or includes a mesh or fabric material embedded in polymer as described above so as not to unravel as it is cut or incised. The interlocking weave allows the user to approximate and close the resultant gap 60 created by the cut or incision with suturing or stapling as is seen in FIG. 6.

Figure 8:
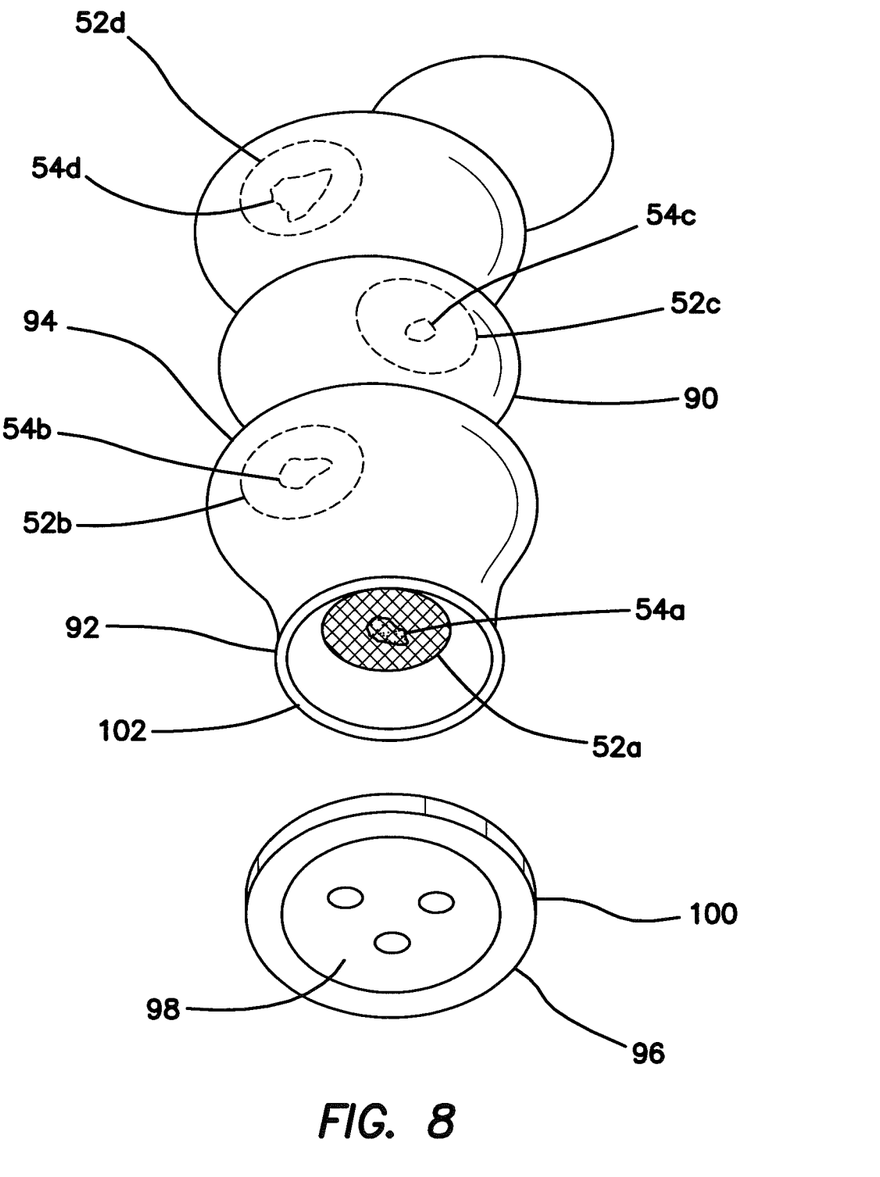
FIG. 8 is a perspective view of a synthetic organ combination with an arrangement of synthetic tumors within a synthetic body conduit and an access port according to the present invention.

Referring now to FIG. 8, an arrangement of a plurality of synthetic tumor-beds of subject material 52a, 52b, 52c, 52d is seen within a synthetic body conduit 90. In this example, the body conduit 90 is a simulated human rectum 92 and a portion of sigmoid colon 94. The body conduit 90 is constructed of an elastomeric material such as silicone rubber that is not meltable by the temperatures generated by the heat-generating instrument 64. The tumor beds of subject material 52a, 52b, 52c, 52d are constructed of a woven or mesh/fabric embedded polymeric material selected to be meltable by the simulated energy-based heat-generating instrument 64. Synthetic tumors of target material 54a, 54b, 54c, 54d are placed upon or beneath the tumor beds of subject material 52a, 52b, 52c, 52d, respectively. The tumors of target material 54 are formed from a material having a melting temperature that may or may not be meltable by the temperature generated by the simulated energy-based heat-generating instrument 64 of the present invention. Care by the clinician involves approximating or circumscribing the tumor with the heat-generating instrument 64 so as not to melt the target material 54. Endoluminal surgical instruments may be used to excise the tumors of target material 54 from the tumor beds of subject material 52a, 52b, 52c, 52d. In one variation, the body conduit 90 is constructed to simulate an insufflated conduit. A seal member 96 having a penetrable gel layer 98 within a ring 100 of rigid plastic as seen in FIG. 8 may be placed at the proximal opening 102 of the body conduit 90 to more realistically emulate an actual surgical arrangement for the practice of transanal endoscopic microsurgery techniques.

Synthetic materials are used to create a simulated tissue 38 model for training or demonstrating energy-based surgical techniques where a first base material 50 comprises a non-meltable material such as silicone rubber, natural latex, polyisoprene rubber, thermoset or other material that can withstand an elevated temperature or have an otherwise higher melting temperature relative to the meltable subject material 52. A second woven or non-woven meltable subject material 52 is attached to a first base material 50 as desired to simulate a surgical subject area 56. For instance, an abdominal training or demonstration simulation tissue 38 may comprise a sheet of non-meltable base material 50 covered with a sheet of meltable subject material 52. The meltable subject material 52 may be cut/melted as desired with a heat-generating instrument 64 having a cutting exposed probe tip 82 as would be the case with a real energy-based surgical instrument. Alternately, the first base material 50 comprises a meltable material that may also be cut or incised using a heated heat-generating instrument 64. The meltable first base material 50 may be chosen from a variety of materials that melt at the same temperature as the second woven meltable material or at alternate temperatures, higher or lower with the target material being painted/dyed in a shape or color to simulate a tumor or other tissue structure desired to be excised from the rest of the simulated tissue. Using materials of varying melt temperatures may provide the user with a more realistic emulation of actual electrosurgical effects. Table 1 is an exemplary list that is not comprehensive of materials and their respective melt temperatures. The materials in Table 1 have varying melt temperatures and one or more materials from the table can be combined to form a tissue structure of the present invention. They are combined as a first material having a high melting temperature and a second material having a lower melting temperature relative to the first material. The simulated energy-based surgical instrument is accordingly configured to deliver heat sufficient to melt the first material yet insufficient to melt the second material. In another variation, the temperature of the instrument creates a desired thermoplastic deformation in the first material that is differentiated from the effect created when the instrument is placed adjacent or in contact with the second material. The effect may be differentiated in the second material in a variety of ways such as not being meltable or plastically deformable like the first material. The simulated energy-based surgical instrument may also be configured to be capable of preselecting, setting or dialing-in the desired temperature generated by the simulated instrument. Of course, it is within the scope of the present invention to use the same material throughout the tissue structure and a simulated energy-based surgical instrument that delivers the appropriate temperature to melt said same material for the practice of energy-based techniques such as practicing to excise the target areas by avoiding or circumscribing target areas and melting the surrounding margin for removal of the target area. In such a case, the target areas are denoted by differences in tissue structure color, shape and/or other markers to visually identify to the trainee a tumor, lesion or other target tissue or path to be followed for a successful clinical outcome.

TABLE 1

| Material | Degrees (F.) | Material | Degrees (F.) |
| --- | --- | --- | --- |
| Acetal (CoPo) | 400 | PBT | 500 |
| Acetal (HoPo) | 425 | PCT | 580 |
| Acrylic | 425 | Peek | 720 |
| Acrylic (Mod) | 500 | PET | 540 |
| ABS (MedImp) | 400 | Polycarbonate | 550 |
| ABS (HiImpFR) | 420 | Polyetherimide | 700 |
| CelAcetate | 385 | Polyethylene (LD) | 325 |
| CelButyrate | 350 | Polyethylene (HD) | 400 |
| CelPropionate | 350 | Polypropylene | 350 |
| EVA | 350 | Polystyrene (GP) | 350 |
| LCP | 500 | Polystyrene (MI) | 380 |
| Nylon (6) | 500 | Polystyrene (HI) | 390 |
| Nylon(6/6) | 525 | Polysulfone | 700 |
| Polyamide-imide | 650 | PPO | 575 |
| Polyarylate | 700 | PVC (Rigid/Flex) | 350/325 |
| TFE | 600 | | |

The synthetic simulated tissue 38 comprises at least one or more areas of thermoplastically deformable material. The heat-generating instrument 64 is shaped as a real energy-based medical device such as a blade, scissors, or forceps. The heat-generating instrument 64 is connected to a power source 44 and configured to generate heat in at least one part of the heat-generating instrument 64 such as the exposed probe tip 82 of the heat-generating instrument 64. The heat-generating instrument 64 is used and manipulated by the trainee who can place it in juxtaposition or in contact with the synthetic simulated tissue 38 to perform or practice a simulated surgical technique to create the desired clinical effect for training purposes. The desired clinical effect is achieved as a result of the user's manipulation of the electrode heat-generating instrument 64 relative to the synthetic simulated tissue 38. For example, placing the electrode exposed probe tip 82 near, adjacent, in juxtaposition or in contact with at least one area of thermoplastically deformable material of the synthetic simulated tissue 38 creates local heating of the at least one area of thermoplastically deformable material. The duration which the user keeps the heat-generating instrument 64 in juxtaposition to the at least one area will also affect the simulated clinical outcome. Local heating in the at least one area of thermoplastically deformable material is effected until the thermoplastically deformable material softens. Once softened, the user may subject the at least one area of thermoplastically deformable material to a pressure with the heat-generating instrument 64 that is high enough to cause further deformation at the heated location of the at least one area of thermoplastically deformable material. The degree of deformation is governed by the duration, intensity of pressure applied with the instrument, the temperature of the heat-generating instrument 64 and type of material. The pressure applied with the instrument in combination with the softening as a result of localized heating creates a mechanical rupture of the material relative to the surrounding material. An amorphous plastic will go through a series of phases. Upon the application of heat, the plastic molecules will begin moving and the material will change from a hard substance to a softer substance and transition to a liquid before eventual degradation. The point at which the substance becomes a liquid is the glass transition phase which may be at a temperature significantly below the material's melting temperature. For a crystalline material, the molecules will begin to move when the temperature is close to the melting point of the material. Manipulation and selective deformation, heating, softening and melting of the synthetic simulated tissue 38 of the present invention permits the user to practice various simulated energy-based effects such as coagulation, vaporization, ablation and cutting and is a function of how the surgeon holds the heat-generating instrument 64 with respect to the simulated tissue 38. Holding the heat-generating instrument 64 in close proximity to the tissue to effect local heating and deformation versus activating while in direct contact of the heat-generating instrument 64 with synthetic simulated tissue 38 allows the user to achieve a wide variety of effects at a given temperature output of the heat-generating instrument 64. The instrument temperature preset or adjusted to aid in simulating other clinical effects such as fulguration, desiccation and ablation.

In one variation, the at least one area of thermoplastically deformable material is adjacent to at least one other area of thermoplastically deformable material that has a relatively higher melting, softening or glass transition temperature. In another variation this at least one other area is not thermoplastically deformable. Hence, the synthetic simulated tissue 38 is a combination of two or more materials of relative deformation characteristics. These relative deformation characteristics may include differences in the materials themselves, their thicknesses, melting temperatures, glass transition temperatures and the like. The combination of materials is pre-arranged to predefine a surgical pathway to be followed by the surgeon for example in circumscribing with the heat-generating instrument 64 a synthetic tumor or completely melting a synthetic tumor in the practice of ablating a tumor. The predetermined surgical pathway is formed of a first material that is thermoplastically deformable/meltable relative to a second material. In one variation, the first material is a thermoplastic and the second material is a thermoset. In another variation, the first and second materials are both thermoplastics with the first material having a lower melting temperature than the second material and the simulated instrument being configured to deliver heat sufficient to melt the first material. At least a portion of the first material forms the predefined surgical pathway that also defines a successful or desired clinical outcome based on the anatomy of the tissue structure or the skill or technique desired to be taught to the user with a particular synthetic tissue model. In one variation, the predetermined pathway formed in at least a portion of the first material is flanked on at least one side by the second material. The at least two materials are configured in the simulated tissue such that their relative thermoplasticity defines a predetermined surgical pathway of a desired clinical outcome to be trained. The predetermined surgical pathway defined in or by the first material by itself or relative to the second material is not visible to the user on the basis of any visible characteristics inherent in the first material alone relative to the second material. Instead, other anatomical markers such as colors, markings or shapes on the first and second materials provide visual indication to the user of the path to follow in order to achieve a successful clinical outcome intended in the training simulation. Tactile feedback is provided advantageously when the user touches a portion of the second material with the heat-generating instrument 64 and feels that the second material is relatively harder or not melting as readily as the first material. With such sensory feedback, the user can quickly determine that he/she has veered off the desired clinical pathway, visually confirm the desired pathway and redirect the heat-generating instrument 64 to the location of desired clinical outcome. A pocket fillable with liquid that simulates blood or other body fluid can be formed in the simulated tissue structure and configured such that rupture of the pocket will result in liquid inside the pocket escaping. An event in which the pocket is ruptured can indicate an adverse clinical event.

Mastery of electrosurgery and other energy-based surgical techniques remains a fundamental skill in the repertoire of the accomplished surgeon. The simulation system and method of the present invention provide a realistic, easy and safe way develop this skill. Many alterations and modifications may be made by those having ordinary skill in the art without departing from the spirit and scope of the invention. For these reasons, the above description should not be construed as limiting the invention, but should be interpreted as merely exemplary of the embodiments.

We claim:

1. A method for simulating energy-based surgical procedures, comprising the steps of:
   providing a simulated tissue structure that is not electrically conductive comprising:
      a first thermoplastic material having a first melting temperature; and
   providing a simulated surgical instrument configured to generate heat to thermoplastically deform the first material;
   heating at least a portion of the first material with the simulated surgical instrument; and
   thermoplastically deforming the first material with the simulated surgical instrument.

2. The method of claim 1 further including the step of melting at least a portion of the first material with the simulated surgical instrument.

3. The method of claim 1 further including the step of removing at least a portion of the simulated tissue structure.

4. The method of claim 1 wherein the step of providing a simulated tissue structure includes providing a simulated tissue structure comprising a second material connected to the first material.

5. The method of claim 4 wherein the step of providing a simulated tissue structure includes providing a simulated tissue structure configured such that one of the first material or second material is removable by melting the at least a portion of the first material.

6. The method of claim 4 wherein the second material has a second melting temperature that is higher than the first melting temperature; and the step of providing a simulated surgical instrument includes providing a simulated surgical instrument that is configured to deliver heat to melt the first material and not melt the second material.

7. The method of claim 4 wherein the first and second materials are configured such that the first material surrounds the second material and further including the step of removing the second material by melting the surrounding first material with the simulated surgical instrument.

8. The method of claim 1 further including the step of placing the simulated tissue structure inside a laparoscopic trainer that simulates an abdominal cavity.

9. The method of claim 3 wherein the simulated tissue structure includes a mesh material; and further including the step of suturing at least a portion of the simulated tissue structure together.

* * * * *